United States Patent [19]

Winn, Jr.

[11] 4,183,905

[45] Jan. 15, 1980

[54] PRODUCING PHOSPHORUS OXYHALIDE

[75] Inventor: B. Meredith Winn, Jr., Richmond, Va.

[73] Assignee: Mobil Oil Corporation, New York, N.Y.

[21] Appl. No.: 934,233

[22] Filed: Aug. 16, 1978

[51] Int. Cl.$^2$ .............................................. C01B 25/10
[52] U.S. Cl. .................................................. 423/300
[58] Field of Search .................................... 423/300

[56] References Cited

U.S. PATENT DOCUMENTS

| 3,052,520 | 9/1962 | Draeger et al. | 423/300 |
| 3,956,463 | 5/1976 | Winn, Jr. | 423/300 |

*Primary Examiner*—Delbert E. Gantz
*Assistant Examiner*—Wayne A. Langel
*Attorney, Agent, or Firm*—Charles A. Huggett; Raymond W. Barclay; Claude E. Setliff

[57] ABSTRACT

Improvement in the oxidation of phosphorus trihalide to the oxyhalide in a reactor having a lower reaction zone and at least one upper reaction zone, whereby the trihalide is introduced at the bottom portion of the upper reaction zone and rises upwardly, reacting with oxygen fed in at the bottom portion of said lower reaction zone, the $PX_3$-$POX_3$ mixture exits through exit means in the top portion of said upper reaction zone and is fed therethrough to the topmost portion of said lower reaction zone where said mixture flows downwardly toward the product exit and reacts with upwardly flowing suitable quality oxygen.

6 Claims, 1 Drawing Figure

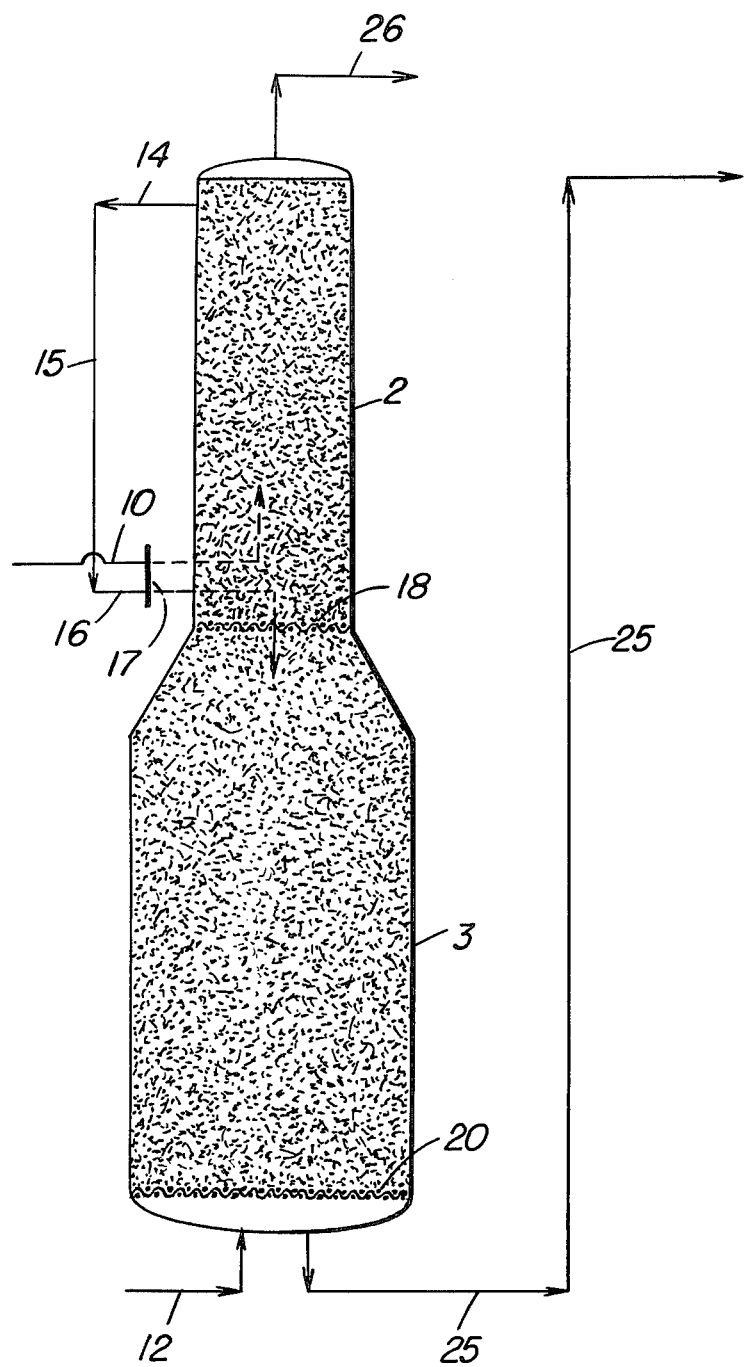

PRODUCING PHOSPHORUS OXYHALIDE

BACKGROUND OF THE INVENTION

1. Field of the Invention

This invention relates to the conversion of phosphorus trihalides to phosphorus oxyhalides by oxygen oxidation. It more particularly refers to carrying out such reaction without forming an explosive mixture, and with minimum usage of oxygen.

2. Discussion of the Prior Art

The oxygen oxidation of phosphorus trihalide, particularly phosphorus trichloride, to phosphorus oxyhalide, particularly oxychloride, is well known and has been commercially practiced for some time. It is known that this oxidation proceeds quite rapidly in an exothermic manner, with suitable quality oxygen. One particular problem resides in the fact that an explosive mixture of phosphorus trihalide and gaseous oxygen forms in an oxygen containing vapor space above a liquid reaction mixture containing at least about 50% phosphorus trihalide. It is obvious that one way to avoid such explosive mixtures is to dilute the reaction mixture so that it contains less than 50% phosphorus trihalide, resolve the product into diluent and product and recycle diluent, or use a plug-flow reactor with excess oxygen. This requires the additional expense of product separation and recycle. If the diluent is a heel of product it improves the economics but it still adds capital and pumping costs.

It would, of course, be desirable to carry out this reaction in such manner as to reduce or eliminate the formation of explosive mixtures while at the same time converting substantially all of the phosphorus trihalide within the confines of a single reactor, without excessive usage of oxygen.

One method for accomplishing this has been described in U.S. Pat. No. 3,956,463. Other pertinent references are U.S. Pat. Nos. 2,002,277; 2,741,542 and 3,052,520.

THE DRAWING

The FIGURE is a schematic front elevation of an apparatus suitable for carrying out the process of the invention.

SUMMARY OF THE INVENTION

In accordance with the invention, there is provided an improved process of converting phosphorus trihalide to phosphorus oxyhalide by reacting phosphorus trihalide with oxygen, which reaction is subject to explosion when the vapor above the liquid reactant contains at least about 50% of phosphorus trihalide, the improvement whereby, in a reactor containing an upper and a lower reaction zone, phosphorus trihalide is fed into the bottom portion of said upper zone and rises to the top thereof while oxygen enters the bottom of said lower zone, the phosphorus trihalide reacts in the upper zone with the rising oxygen to form a $PX_3$-$POX_3$ mixture, the mixture exits through an exit means in the top portion of the upper zone, is discharged near the top of the lower reaction zone and reacts further with the upflowing oxygen as it flows downward toward the product exit.

DESCRIPTION OF SPECIFIC EMBODIMENTS

The invention resides in a process of reacting phosphorus trihalide, preferably phosphorus trichloride, to form the oxyhalide by carrying out the process in an elongated reaction vessel having a lower reaction zone and at least one upper reaction zone. The system employs both counter- and co-current reactions in the same reaction vessel, providing the benefits of both. This is accomplished by admitting $PX_3$ (where X may be Br or Cl, preferably Cl) to the reactor about ⅓ of the way up the column and letting the top overflow through a pipe to the underside of the middle section through the packing support plate. In the specific reactor used, $PX_3$-$POX_3$ mixtures from the top overflow are admitted through the same valve, necessitating a dual pipe entry nozzle.

Since this oxidation is remarkably exothermic, and since it is desirable to minimize passage of phosphorus trihalide from the liquid into the vapor phase and thereby to minimize the explosion hazard, effort should be made to provide maximum cooling to the system. Where the halide reactant is phosphorus trichloride, the stoichiometry of the system is such that, on a weight basis, about 10 times as much phosphorus trichloride as oxygen is required. The reaction is very rapid, phosphorus trichloride absorbing oxygen out of its gas bubbles at a very high rate. By providing for the co- and countercurrent reactions as outline hereinabove, the reaction mixture is such that the reactant ratio is below 50%, the explosive limit for overhead vapors. Cooling can be accomplished by the use of intensive heat exchange cooling at the point of initial reactant mixing. If excess oxygen is introduced into the system, the proportion thereof over stoichiometric will be taken overhead from the down stream end of the reaction zone and may be vented or recycled as desired. Since oxygen recycle requires costly apparatus, minimum oxygen feed is preferred.

The reaction vessel is suitably a vertical column which has internal baffles or packing to restrict back-mixing. Cooling is provided over the entire length of the vessel but more intensive cooling is preferred at the $PX_3$ feed portion of the column.

Referring now to the FIGURE, phosphorus trichloride 10 is fed, through valve 17 to a reaction zone 2, containing a heel of product, along with oxygen 12. An external cooling jacket (not shown) is provided. $POCl_3$ or $PCl_3$-$POCl_3$ mixture overflows at 14 and flows through line 15 to 16, and then through valve 17, where it enters the lower reaction zone 3 through the packing support plate 18. The mixture flows downward, further reacting with oxygen, and passes through porous support plate 20. The product is passed through line 25 to storage, or, if necessary, to a second reactor to complete the reaction if needed. Excess oxygen is withdrawn through line 26 and is either vented to a scrubber or is piped to reuse points.

The following Example illustrates the invention. It should be understood that it is only illustrative, not limiting. Parts are by weight.

EXAMPLE

Prior to beginning the manufacture of $POCl_3$ by the instant process, a heel is established in the upper zone of the reactor by introducing either $PCl_3$, $POCl_3$ or a mixture of them. Following this, 8.48 parts per minute of phosphorus trichloride and 1.0 part per minute of oxygen are fed to the appropriate portions of the reactor. Cooling water at 20° C. is fed to the water jacket such that the maximum temperature in the reactor is 95° C. Product and its mixture with $PCl_3$ are removed from the upper zone at a rate of about 9.33 parts per minute and fed to the lower reaction zone, where the reaction temperature is maintained at 40° C. The product POCl$_3$ exits the bottom of the reactor at line 25 at a rate of about 9.47 parts per minute. Parts are by weight.

It is desirable in the practice of this invention to cool the system sufficiently to remove about 800 to 1,000 BTU's per pound of phosphorus trihalide reacting. Since it is desirable to react away the first 50% of the the phosphorus trihalide as fast as possible, at least half this cooling requirement is concentrated in the first 20 to 30% of the reaction zone immediately upward of the PX$_3$ feed.

It is appropriate to maintain the temperature in the upper reaction zone at from about 95° C. to about 40° C., preferably about 90° C. to about 50° C. The lower reaction zone can be kept at from about 50° C. to about 30° C., preferably about 40° C. to about 35° C.

The ratio of PX$_3$ to oxygen feeds can range from about 8.56:1 parts per minute to about 7.15:1 parts per minute, preferably from about 8.5:1 to about 7.8:1.

The rate of withdrawal of excess O$_2$ from the top of the reactor can range from slightly greater than zero to 20% of stoichiometric, preferably 1 to 10%.

I claim:

1. An improved process of converting phosphorus trihalide to phosphorus oxyhalide by reacting phosphorus trihalide with oxygen, which reaction is subject to explosion when the vapor above the liquid reaction contains at least about 50% of phosphorus trihalide, the improvement comprising, in a reactor containing an upper and a lower reaction zone, feeding phosphorus trihalide into the bottom portion of said upper zone and causing said phosphorus trihalide to rise to the top thereof while oxygen enters the bottom of said lower zone, the phosphorus trihalide reacting in the upper zone with the rising oxygen to form a PX$_3$-POX$_3$ mixture, causing said mixture to exit through an exit means in the top portion of the upper zone and than to be discharged near the top of the lower reaction zone wherein said mixture reacts further with the upflowing oxygen as said mixture flows downward toward a product exit.

2. The process of claim 1 wherein the trihalide is trichloride.

3. The process of claim 1 wherein the reaction in said upper reaction zone is carried out at from about 40° C. to about 95° C.

4. The process of claim 1 wherein the reaction in the said lower reaction zone is carried out at from about 30° C. to about 50° C.

5. The process of claim 1 wherein the ratio of PX$_3$ to oxygen fed to the system ranges from about 8.56 to 1 to about 7.15 to 1.

6. The process of claim 1 wherein the rate of withdrawal of excess oxygen from the top of the reactor ranges from zero to about 20% of stoichiometric.

* * * * *